(12) United States Patent
Nakai et al.

(10) Patent No.: US 8,427,604 B2
(45) Date of Patent: Apr. 23, 2013

(54) DISPLAY DEVICE

(75) Inventors: Yutaka Nakai, Kanagawa (JP); Tsuyoshi Hioki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 212 days.

(21) Appl. No.: 12/979,902

(22) Filed: Dec. 28, 2010

(65) Prior Publication Data

US 2012/0019737 A1    Jan. 26, 2012

(30) Foreign Application Priority Data

Jul. 26, 2010  (JP) ................. 2010-167485

(51) Int. Cl.
*G02F 1/1334* (2006.01)
*G02B 6/00* (2006.01)

(52) U.S. Cl.
USPC ............ 349/86; 349/90; 349/139; 385/40; 385/901

(58) Field of Classification Search ........... 349/33, 349/86, 88, 89, 90, 159, 193, 196; 385/8, 385/16, 40, 901, 147; 362/26, 27, 559, 561
See application file for complete search history.

(56) References Cited

U.S. PATENT DOCUMENTS

| | | | | | |
|---|---|---|---|---|---|
| 5,056,898 | A | * | 10/1991 | Ma et al. ..................... | 349/94 |
| 6,271,899 | B1 | * | 8/2001 | Lewis et al. ................. | 349/86 |
| 7,190,849 | B2 | * | 3/2007 | Katase ......................... | 385/2 |
| 2003/0201969 | A1 | * | 10/2003 | Hiyama et al. .............. | 345/102 |
| 2004/0095524 | A1 | * | 5/2004 | Date et al. ................... | 349/89 |
| 2009/0243980 | A1 | | 10/2009 | Nakai et al. | |
| 2010/0073605 | A1 | * | 3/2010 | Masutani et al. ............ | 349/86 |
| 2010/0177091 | A1 | | 7/2010 | Hioki et al. | |

FOREIGN PATENT DOCUMENTS

| | | |
|---|---|---|
| JP | 6-102496 | 4/1994 |
| JP | 2000-111863 | 4/2000 |
| JP | 2000-147494 | 5/2000 |
| JP | 2002-311410 | 10/2002 |
| JP | 2003-270679 | 9/2003 |
| JP | 2005-221590 | 8/2005 |

OTHER PUBLICATIONS

U.S. Appl. No. 13/239,794, Sep. 22, 2011, Nakai et al.
Office Action issued May 18, 2012 in Japan Application No. 2010-167485 (With Partial English Translation).
U.S. Appl. No. 13/045,222, Mar. 10, 2011, Hioki, et al.

(Continued)

*Primary Examiner* — Dung Nguyen
*Assistant Examiner* — Tai Duong
(74) *Attorney, Agent, or Firm* — Oblon, Spivak, McClelland, Maier & Neustadt, L.L.P.

(57) ABSTRACT

A display device includes a light source, an optical waveguide, a light-extracting portion, a liquid crystal dispersion layer and a drive circuit. The optical waveguide has two ends to guide light from one of the two ends to the other end. The light is emitted by the light source. The light-extracting portion is provided to a side face of the optical waveguide. The liquid crystal dispersion layer is included in the light-extracting portion and includes liquid crystal droplets whose mean diameter is 100 nm or less. The drive circuit applies a voltage to the light-extracting portion to generate an electric field in the liquid crystal dispersion layer so that the light transmitting through the optical waveguide is scattered to be extracted.

9 Claims, 9 Drawing Sheets

OTHER PUBLICATIONS

Michael J. Sansone et al., "Large Kerr effects in transparent encapsulated liquid crystals," Journal of Applied Physics, vol. 67, No. 90, 1990, pp. 4253-4259.

Michael J. Sansone et al., "Large Kerr effects in transparent encapsulated liquid crystals," Journal of Applied Physics, vol. 67, No. 90, 1990, pp. 4253-4259, May 1990.

* cited by examiner

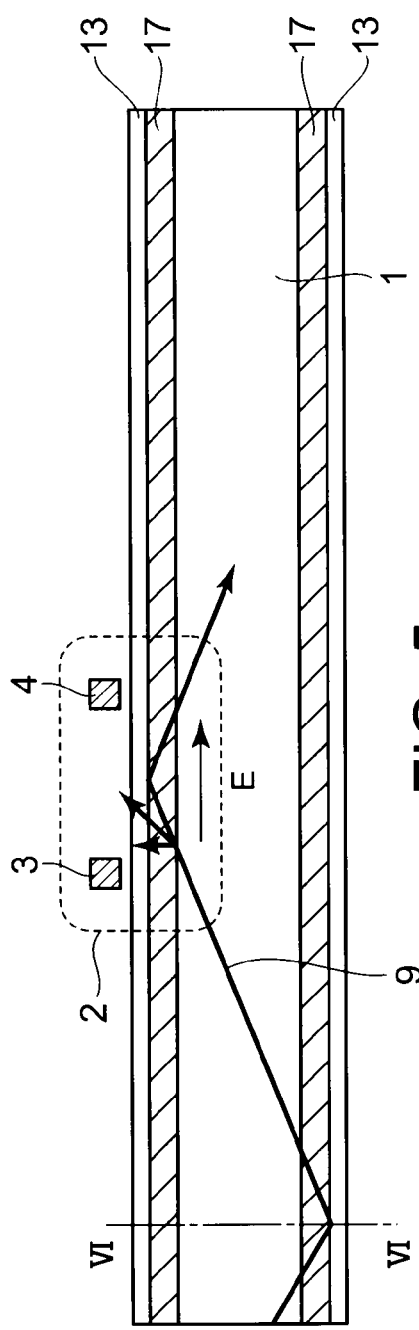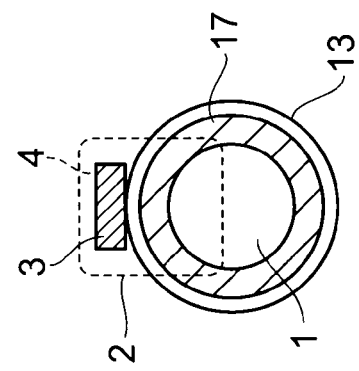

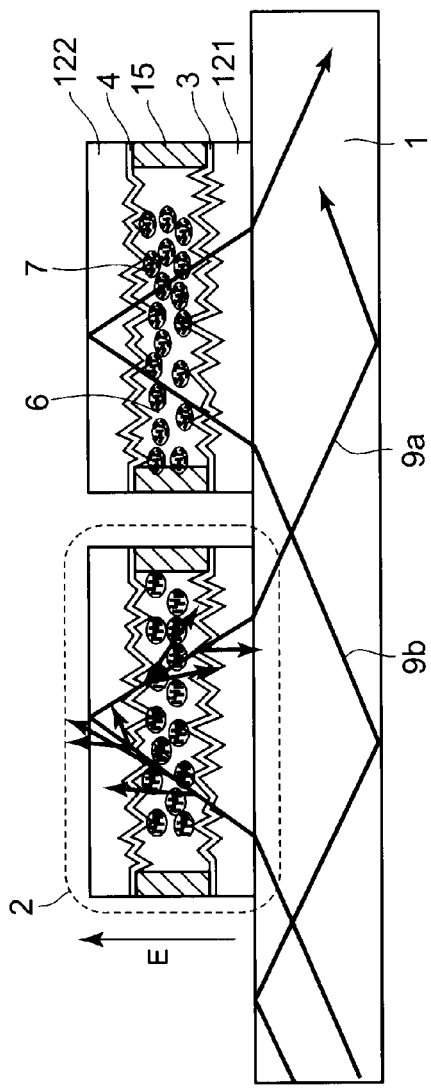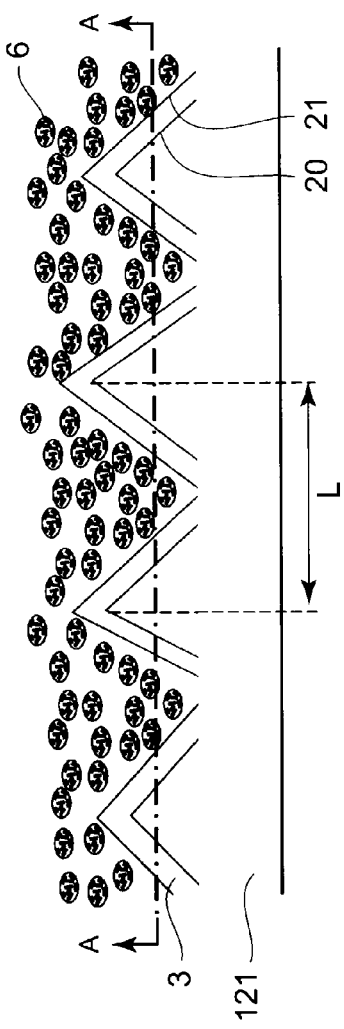

DISPLAY DEVICE

CROSS REFERENCE TO RELATED APPLICATION

This application is based upon and claims the benefit of priority from the prior Japanese Patent Application No. 2010-167485, filed on Jul. 26, 2010, the entire contents of which are incorporated herein by reference.

FIELD

Embodiments basically relate to a display device.

BACKGROUND

In recent years, a display device using optical waveguides has been proposed. This display device includes two or more aligned optical waveguides and two or more light-extracting portions provided to side faces of the respective waveguides. The light-extracting portions are changed physically or chemically to switch between extraction and nonextraction of light from the respective side faces of the light-extracting portions, thereby enabling it to display an image.

BRIEF DESCRIPTION OF DRAWINGS

Aspects of this disclosure will become apparent upon reading the following detailed description and upon reference to accompanying drawings. The description and the associated drawings are provided to illustrate embodiments of the invention and not limited to the scope of the invention.

FIGS. 5 and 6 are enlarged views showing sectional structures of a display device according to a third embodiment.

FIGS. 9A and 9B are enlarged sectional views showing a display device according to a fifth embodiment.

DESCRIPTION

As will be described below, according to a first embodiment, a display device includes a light source, an optical waveguide, a light-extracting portion, a liquid crystal dispersion layer and a drive circuit. The optical waveguide has two ends to guide light from one of the two ends to the other end. The light is emitted by the light source. The light-extracting portion is provided to a side face of the optical waveguide. The liquid crystal dispersion layer is included in the light-extracting portion and includes liquid crystal droplets whose mean diameter is 100 nm or less. The drive circuit applies a voltage to the light-extracting portion to generate an electric field in the liquid crystal dispersion layer so that the light transmitting through the optical waveguide is scattered to be extracted.

First Embodiment

Figure 1:
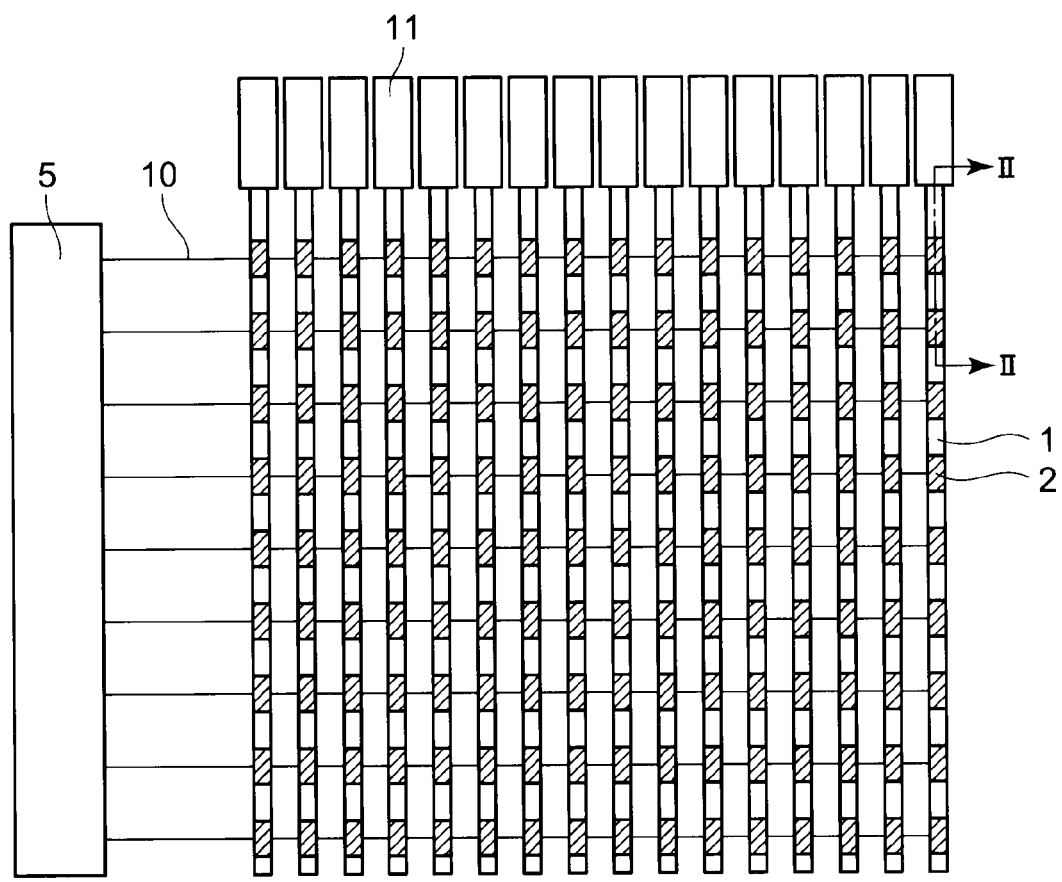
FIG. 1 is a plan view showing a display device according to a first embodiment.
Figure 2:
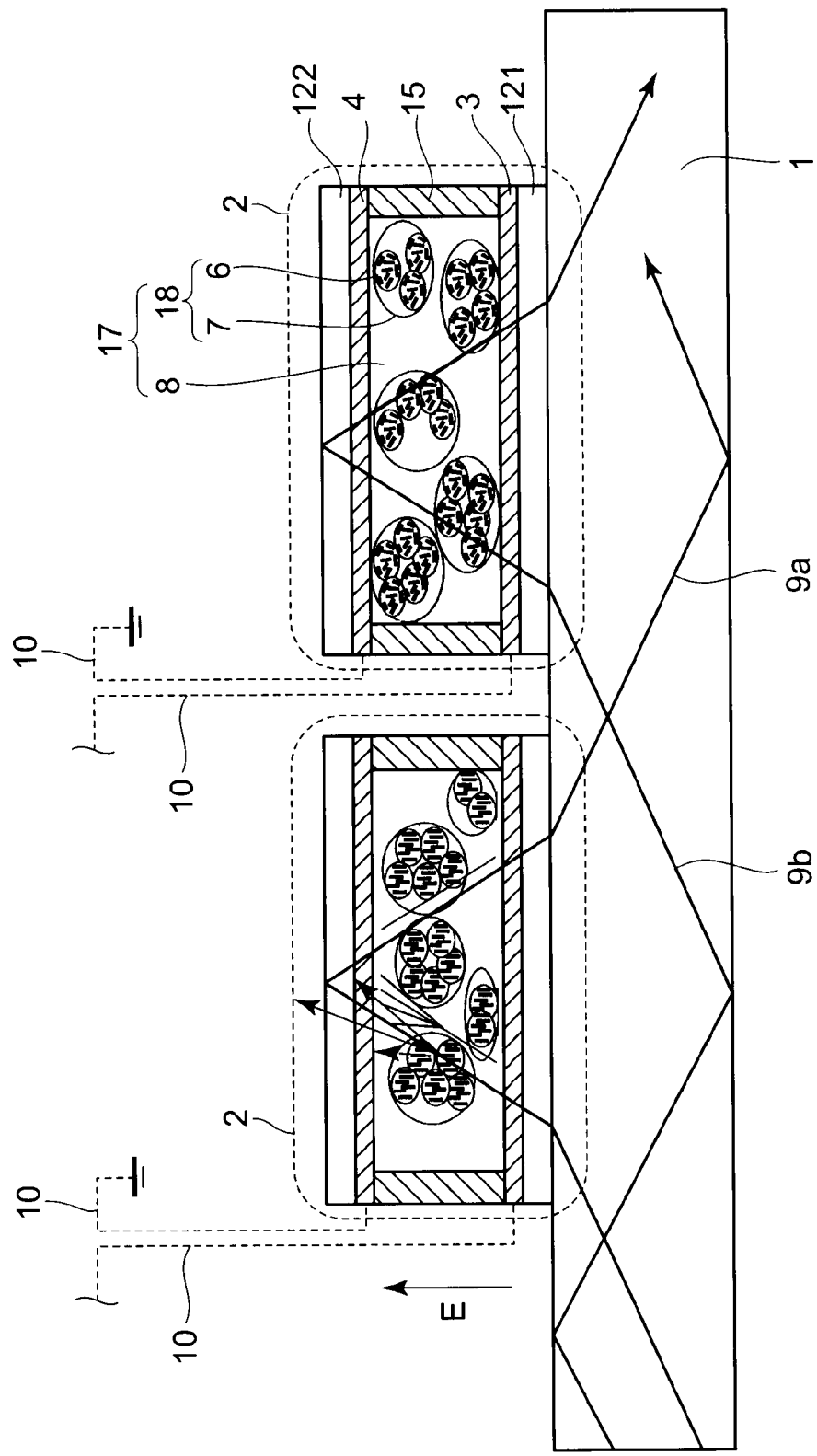
FIG. 2 is an enlarged sectional view of the display device cut along the dashed line II-II shown in FIG. 1.

A display device according to the first embodiment will be explained with reference to FIGS. 1 and 2. FIG. 1 is a plan view showing the display device. FIG. 2 is an enlarged view showing a section cut along the dashed line II-II in a longitudinal direction of an optical wave guide 1 in the display device shown in FIG. 1.

As shown in FIG. 1, the display device is provided with two or more light sources 11 arrayed in one direction, two or more columnar optical waveguides 1, and two or more light-extracting portions 2. The optical waveguides 1 extend in a direction perpendicular to an array direction of the light sources 11 and are connected to the respective light sources 11. The light-extracting portions 2 are provided to side faces of the respective optical waveguides 1 at a regular pixel-pitch "d."

The display device is further provided with a drive circuit 5 and two or more scanning lines 10 to be connected to the drive circuit 5. Each scanning line 10 is arranged at a regular pixel-pitch "d" to intersect nearly perpendicularly with each optical waveguide 1 so that the respective scanning lines 10 are in contact with the respective light-extracting portions 2 at the intersections of the scanning lines 10 and the optical wave guides 1.

In the embodiment, each light-extracting portion 2 is assumed to form one pixel. Alternatively, two or more light-extracting portions 2 may form one pixel.

M light sources 11 are arranged in the horizontal direction and N light-extracting portions 2 every optical waveguide are arranged in the vertical direction, thereby allowing it to display a two-dimensional image including M pixels in the horizontal direction and N pixels in the vertical direction (M and N are natural numbers). The first line to the N-th line are switched in series to be scanned in the vertical direction by one line including M light-extracting portions 2 in the horizontal direction, thereby allowing it to display an image.

The respective pieces of image data for the i-th line are supplied to the light sources 11 so that each light source 11 emits light having the corresponding intensity and color for the i-th row. The light transmits through the respective optical waveguides 1 extending in the vertical direction.

Being synchronized with the emitting of the light, a drive signal is sent only to the i-th scanning line 10 from a drive circuit 5. The light-extracting portion 2 to which the drive signal has been sent switches into extraction of light. That is, only the i-th light-extracting portion 2 in the vertical direction switches into the extraction of light, while the rest are in nonextraction of light. As a result, the light transmitting through each optical waveguide 1 corresponds to the image data for the i-th line, and is extracted by the light-extracting portions on the i-th line. After a predetermined time of interval, the respective pieces of image data for the (i+1)-th row are supplied to the light sources 11 and the drive circuit 5 selects the (i+1)-th scanning line to supply a drive signal, thereby allowing light corresponding to the (i+1)-th pieces of image data to be extracted from the (i+1)-th light-extracting portions 2.

A mechanism to supply a drive signal to the light-extracting portions 2 and to extract light from the light-extracting portions 2 will be described later with reference to FIG. 2.

As shown in FIG. 2, the light-extracting portion 2 includes the followings:
a first transparent substrate 121 provided to a side face of the optical waveguide 1;
a first electrode 3 provided to the first transparent substrate 121;
a liquid crystal dispersion layer 17 provided to the first electrode 3;
a second electrode 4 provided to the liquid crystal dispersion layer 17; and
a seal material 15 which is provided between the first electrode 3 and the second electrode 4 so that the seal material 15 surrounds the liquid crystal dispersion layer 17.

The liquid crystal dispersion layer 17 has an optically transparent porous body 8 having pores with a mean diameter of 300 nm or more, and aggregates 18 provided to the pores of the porous body 8. The aggregate 18 includes a transparent member 7 and liquid crystal droplets 6. That is, so called "Polymer Dispersed Liquid Crystal (PDLC)" is adopted, which has liquid crystal droplets dispersed in the transparent member 7.

A porous film is employed for the porous body 8, for example. Heat or ultraviolet curable materials, such as ultraviolet curable resin etc., are employed for the transparent member 7. An ultraviolet curable material is arranged in an uncured state to be cured later. A nematic liquid crystal is employed for a liquid crystal material, whose liquid crystal molecules are oriented by an electric field. A mixing ratio of a liquid crystal material and a material of the transparent member 7 is properly determined in accordance with the respective materials so that the liquid crystal material easily forms the liquid crystal droplets 6.

The first and second electrodes 3, 4 are arranged in a direction perpendicular to the side face of the optical waveguide 1 to hold the liquid crystal dispersion layer 17, and are, therefore, preferably transparent. A pair of transparent substrates 121, 122 holds the first and second electrodes 3, 4. The scanning lines 10 are connected to the first and second electrodes 3, 4. The scanning line 10 connected to the first electrode 3 is connected to the drive circuit 5, and the scanning line 10 connected to the second electrode 4 is grounded. A voltage is applied to the first electrode 3 from the drive circuit 5 via the scanning line 10, thereby generating an electric field in the liquid crystal dispersion layer 17.

Pores with a mean diameter of 300 nm or more are formed to disperse in the porous body 8. The mean diameter of the pores is prescribed to be 500 nm, for example. A mean diameter of the liquid crystal droplets is 100 nm or less. In this embodiment, the mean diameter is set to 50 nm, for example. Ultraviolet curable resin is employed for the transparent member 7, thereby allowing the aggregates 18 to fit into the pores of the porous body 18. The mean diameter of the aggregates 18 is almost the same as that of the pores of the porous body 8, i.e., 300 nm or more. In this embodiment, the mean diameter of the aggregates 18 is prescribed to be 500 nm, for example. Materials are chosen for the porous body 8 and the liquid crystal droplets 6 so that both the two materials have the same refractive index when no electric field is generated therein. Here, "the same refractive index" means that light is scarcely scattered inside the optical waveguide 1 when the aggregates 18 including both the liquid crystal droplets 6 and the transparent members 7 are dispersed in the porous body 8.

In a section parallel to the side face of the optical waveguide 1, the liquid crystal dispersion layer 17 has a first portion inside the pores with a mean diameter of 300 nm and a second portion provided with the porous body 8 which surrounds the first portion. The first portion includes the liquid crystal droplets 6 and the transparent member 7 (first material) to be defined as an aggregate. When no electric field is generated, the indexes of the aggregates 18 and the porous body 8 are equal to each other.

An equivalent refractive index $n_{iso}$ of the liquid crystal droplets 6 is given by a mathematical formula 1. Here, $n_e$ is a refractive index of a liquid crystal to the extraordinary ray, and $n_o$ is a refractive index of the liquid crystal to the ordinary ray. The refractive index of the aggregate 18 is an average of the refractive indexes of the liquid crystal droplets 6 and the transparent member 7. When the averaged refractive index of the liquid crystal droplets 6 and the transparent member 7 is equal to that of the porous body 8, the liquid crystal dispersion layer 17 becomes transparent.

$$n_{iso} = \frac{n_e + 2n_o}{3} \qquad \text{[mathematical formula 1]}$$

Electrically conducting transparent materials, such as ITO (indium-tin-oxide alloy), are employed for the first electrode 3 and the second electrode 4. Transparent insulating materials, such as polyethylene terephthalate (PET), polycarbonate, acrylic resin, etc. are employed for the transparent substrates 121, 122. Materials, such as epoxy resin, are employed for the seal material 15. Acrylic resin is employed for the optical waveguide 1, for example.

The drive circuit 5 selects the scanning line 10 so that a voltage is applied to the first and second electrodes 3, 4 of the light-extracting portion 2 provided to the scanning line 10, thereby generating an electric field in the liquid crystal dispersion layer 17.

As shown in the light-extracting portion 2 on the right-hand side of FIG. 2, when a voltage is not applied to the electrodes 3 and 4, a liquid-crystal molecular orientation is random in the liquid crystal droplets 6. Such a random liquid-crystal molecular orientation makes the following two refractive indexes equal to each other. One is a refractive index in a direction perpendicular to the transparent substrates 121, 122. The other is a refractive index in an oblique direction thereto.

Under such a condition, light transmitting through the optical waveguide 1 undergoes total internal reflections to reach the side face of the optical waveguide 1 to which the light-extracting portion 2 is provided. Then, as shown by the arrow 9b, the light passes through the liquid crystal dispersion layer 17 and is reflected internally at the second transparent substrate 122. The light internally reflected is returned to the optical waveguide 1 via the liquid crystal dispersion layer 17.

On the other hand, as shown in the light-extracting portion 2 on the left-hand side of FIG. 2, when a voltage is applied to the electrodes 3 and 4, an electric field is generated in the liquid crystal dispersion layer 17 to make liquid crystal molecules orient in a direction perpendicular to the transparent substrates 121, 122. At this time, the refractive index of the liquid crystal drop 6 changes to change the equivalent refractive index of the aggregates 18, thereby differentiating the refractive index of the aggregates 18 from that of the porous body 8. That is, the liquid crystal dispersion layer 17 switches into a light scattering condition.

Under such a condition, when light transmitting through the optical waveguide 1 undergoes total internal reflections reaches the side face of the optical waveguide 1 to which the light-extracting portion 2 is provided, the light passes through the liquid crystal dispersion layer 17 as shown by the arrow 9a. At this time, a difference arises between the refractive indexes of the aggregate 18 and the porous body 8 to scatter the light. Some components of the light scattered in the liquid crystal dispersion layer 17 are refracted and come out of the light-extracting portion 2 when the incident angles of the components are smaller than a critical angle of the total internal reflection for light incidence to the second transparent substrate 122.

Thus, switching on and off a voltage applied to the electrodes 3, 4 controls the liquid-crystal molecular orientation in the liquid crystal dispersion layer 17, thereby allowing it to switch extraction and nonextraction of light from the optical wave guide 1.

A response speed of the liquid crystal to an electric field is dependent on the size of the liquid crystal droplets 6. The liquid crystal droplets 6 having a mean size of 100 nm or less enable a rapid response of 100 μsec or less.

Moreover, visible light having a wavelength of 360 nm to 750 nm is generally employed for the light traveling inside the optical waveguide 1. There could be a case that the size of the aggregate 18 is too small or the liquid crystal droplets 6 do not form an aggregate. In such a case, even if an electric field is generated in the liquid crystal dispersion layer 17 to change the refractive indexes of the liquid crystal droplets 6, there is a possibility that the light scattering is not caused. However, the mean size of the aggregates 18 is actually 300 nm or more, and the aggregates having the mean size can cause the light scattering.

The drive circuit 5 scans all the scanning lines 10 one by one to control extraction and non-extraction of light for all the light-extracting portions 2, thereby enabling it to display an image on the display device.

The seal material 15 is mainly intended to prevent the liquid crystal dispersion layer 17 from being exposed to the air, thereby preventing reliability degradation thereof. Therefore, the seal material 15 is not essential. The seal material is provided with an optical absorption characteristic to prevent a leakage of light from the liquid crystal dispersion layer 17 via the seal material 15, thereby enhancing image quality of the display device.

Figure 3A:
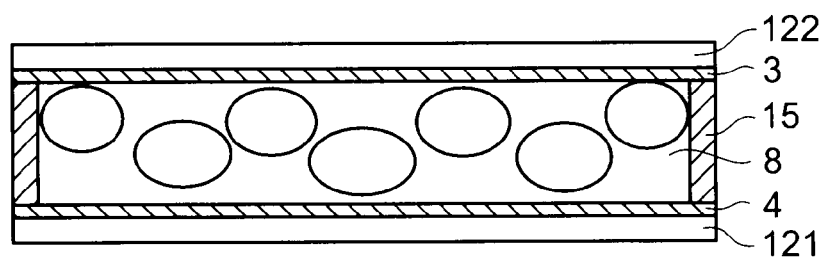
FIGS. 3A to 3C are sectional views showing manufacturing steps of the display device according to the first embodiment.
Figure 3B:
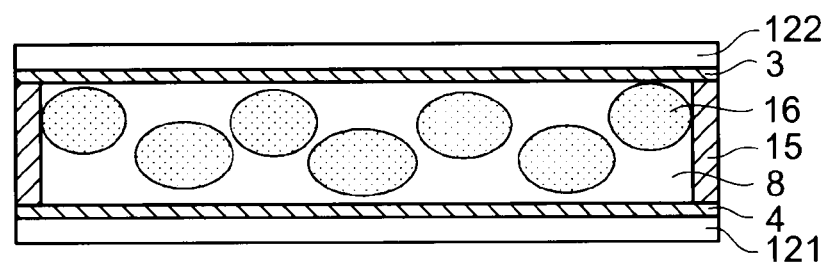
Figure 3C:
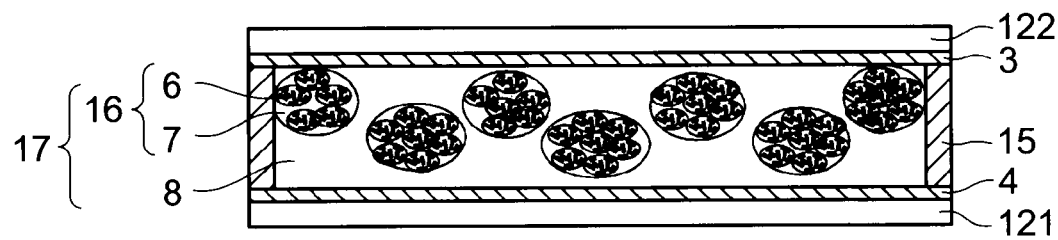

FIGS. 3A to 3C are sectional views showing manufacturing steps of the light-extracting portion 2 of this embodiment.

As shown in FIG. 3A, the first and second electrodes 3, 4 are provided onto each main surface of a pair of transparent substrates 121, 122 such that the first and second electrodes 3, 4 face each other. The distance between the first and second electrodes 3, 4 is prescribed to be, e.g., 10 μm to 50 μm, and is specifically 30 μm in the mean. The seal material 15 provided in frame-like fashion between the first and second electrodes 3, 4. The frame-like seal material 15 is provided preliminarily with an entrance to fill up the inside of the light-extracting portion with the porous body 8 as will be mentioned later. The porous body 8 is introduced via the entrance to the inside a case framed by the first and second electrodes 3, 4 and the seal material 15 to fill up the case therewith. A filmy porous body like a membrane filter including many pores having a mean diameter of 300 nm is employed for a material of the porous body 8.

Next, as shown in FIG. 3B, a mixture 16 of the liquid crystal material and the material of transparent member 7 is made to percolate in the porous body 8. Ultraviolet curable resin is employed for the material of the transparent member 7.

The porous body 8 and the mixture 16 are irradiated with ultraviolet to polymerize the ultraviolet curable resin so that the ultraviolet curable resin changes into the transparent member 7.

As a result, as shown in FIG. 3B, the insides of the pores in the porous body 8 are filled with the materials of the transparent member 7 and the liquid crystal. When the material of the transparent member 7 is cured by the ultraviolet irradiation, the material of the liquid crystal forms the liquid crystal droplets 6, thereby completing the liquid crystal dispersion layer 17 as shown in FIG. 3C. The thickness of the liquid crystal dispersion layer 17 is prescribed to be, e.g., 10 μm to 50 μm, and is specifically 30 μm on average. The mean diameter of the aggregates 18 is determined by the sizes of the pores, i.e., the transparent members 7, and is specifically 30 nm.

Alternatively, the porous body 8 can be manufactured employing the same method as a conventional method to manufacture PDLC. That is, a mixture of the liquid crystal and the resin is introduced to a case framed by the first electrode 3, the second electrode 4 and the seal material 15 to fill the case therewith. Then, the mixture is cured with ultraviolet irradiation to disperse the liquid crystal droplets in the resin. The percentage of the liquid crystal or irradiation intensity of ultraviolet is altered to allow it to change the sizes of the liquid crystal droplets. Then, the liquid crystal droplets are removed with solvents, such as acetone to provide the porous body including pores being places from which the liquid crystal droplets have been removed. After the mixture of the liquid crystal material and the material of the transparent members is made to percolate in the porous body, the mixture is irradiated with ultraviolet to form liquid crystal droplets having a droplet size shorter than the wavelength of visible light in the pores.

An example will be specifically shown below.

E7 (by Merck Co., Ltd., no=1.522, ne=1.746), NOA81 (by Norland Co., Ltd., refractive index 1.56) and polycarbonate (refractive index 1.59 to 1.60) were employed for the nematic liquid crystal, ultraviolet curable resin and the porous body, respectively. The mixture ratio of liquid crystal versus resin was set to 30:70. The liquid crystal and the resin were mixed well and were made to percolate through a membrane filter made from polycarbonate (by Millipore Co., Ltd., mean pore size of 0.6 μm, thickness of 20 μm). Then, the mixture was irradiated with ultraviolet (300 mW/cm$^2$) to cure the resin, thereby allowing it to acquire the liquid crystal dispersion layer with fine liquid-crystal droplets formed in the resin matrix. The mean diameter of the liquid crystal droplets was 50 nm, and aggregates having a mean diameter of 600 nm were formed. As a result, the liquid crystal dispersion layer was transparent.

The acquired liquid crystal dispersion layer was sandwiched between a pair of transparent substrates each having transparent electrode of ITO (indium tin oxide) formed thereon. A voltage of 200V was applied between the transparent substrates so that the liquid crystal dispersion layer switched into light scattering. Moreover, a response speed thereof was about 20 μsec.

Furthermore, the obtained light-extracting portion was made to be in contact with the optical waveguide made from acrylic. The contact area of the optical waveguide was coated with coupling oil having a refractive index of 1.50 so that the light-extracting portion was optically in contact with the optical waveguide. A light emitting diode was arranged at one end of the optical waveguide as a light source so that light entered the optical waveguide from the light emitting diode. Light was not extracted when the light-extracting portion was transparent (no voltage application), whereas light was extracted when a voltage was applied to the light-extracting portion to switch the portion into light scattering. No leakage of light was observed for the transparent light-extracting portion, thereby showing no light loss therethrough.

Next, two or more optical waveguides having light sources at one end thereof were arranged parallel to each other, as shown in FIG. 1. And, two or more scanning lines were arranged parallel to each other so that the scanning lines were perpendicular to the optical waveguides. Coupling oil was used for the contacts between the light-extracting portions and the optical waveguides. Instead of using the coupling oil, the light-extracting portions and the optical waveguides can be fixed to each other using ultraviolet curable resin after assembling.

200V was applied arbitrarily to the scanning lines one by one from the drive circuit, and the light-extracting portions were switched into states of light extraction for every scanning line 10. Being synchronized with the 200V application, light with prescribed intensity and color was introduced to the optical waveguides from two or more light sources, and the light was extracted from the light-extracting portions provided to the scanning lines which were selected by the drive circuit. A sequence of these actions was repeated in series for all the scanning lines, thereby allowing it to display an image. It was shown that the light-extracting portion responded rapidly by about 10 µsec so that the display device in accordance with the first embodiment was capable of following a moving image.

As mentioned above, according to the first embodiment, a display device with high use efficiency of light is provided, which has a low loss of light, i.e., a less leakage of light from the light-extracting portions when no voltage is applied thereto.

In addition, an equivalent refractive index of the aggregates in this example is calculated to be 1.571 on the basis of the mathematical formula 1. A refractive index of the polycarbonate used for the porous body ranges from 1.59 to 1.60, which was slightly higher than the refractive index of the aggregate, but showed mostly no light loss when no voltage is applied. Choosing the porous body whose refractive index is closer to that of the aggregate allows it to further reduce light loss when no voltage is applied.

In addition, although the section of the optical waveguide 1 is not limited in particular, this embodiment is enabled also for an optical waveguide having various cross-sectional forms, such as a square, a circle, an ellipse, etc.

Second Embodiment

Figure 4A:
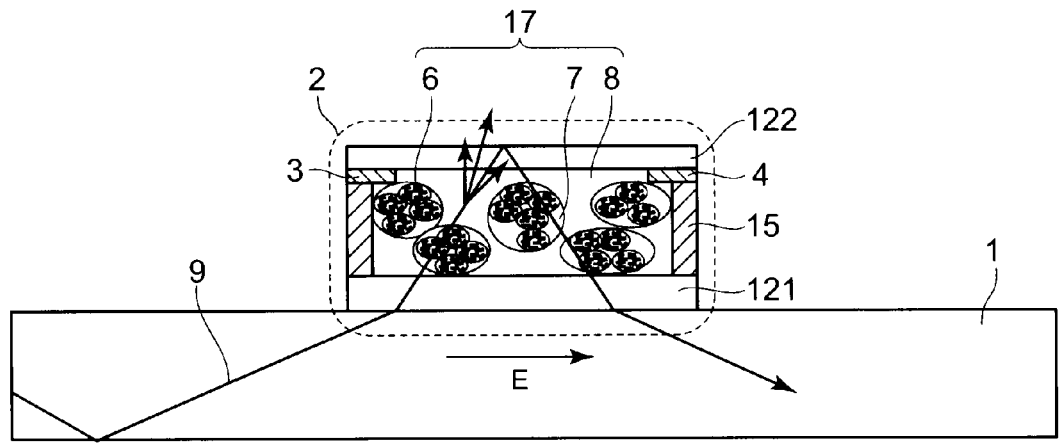
FIGS. 4A and 4B are enlarged views showing sectional structures of one pixel of a display device according to a second embodiment.
Figure 4B:
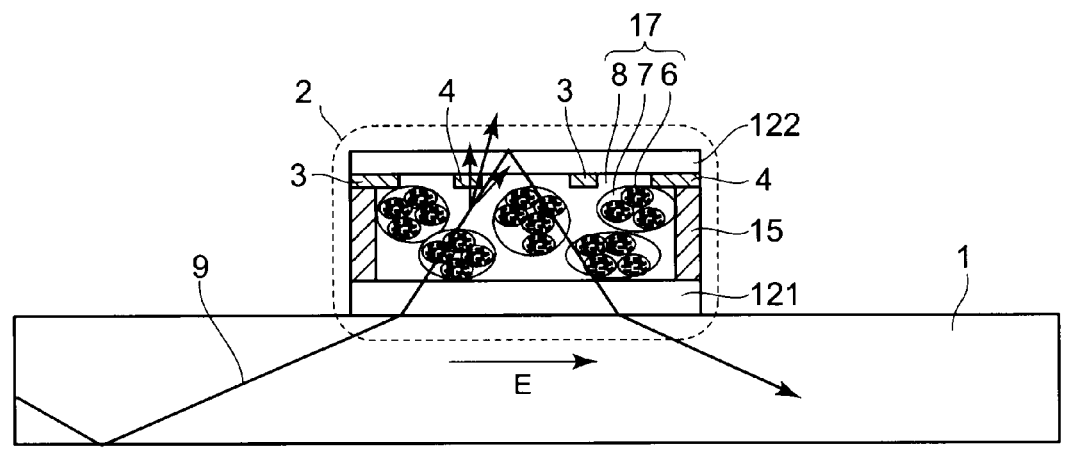

FIGS. 4A and 4B are views showing cross-sectional structures of one pixel of a display device according to a second embodiment.

The second embodiment differs from the first embodiment in the arrangement of the first and second electrodes 3, 4. Wherever possible, the same reference numerals or marks will be used to denote the same or like portions throughout figures, and overlapping explanations will be omitted in embodiments below.

As shown in FIG. 4A, the electrodes 3, 4 are arranged parallel to the second transparent substrate 122 on the liquid crystal dispersion layer 17 to apply a voltage to the liquid crystal dispersion layer 17 in a so-called "in-plane mode", thereby generating an electric field in a plane parallel to a side face of the optical waveguide 1. The electrodes 3, 4 are arranged at the outer edge of the light-extracting portion 2.

In the first embodiment, when no voltage is applied, the light which is incident on the light-extracting portion from the optical waveguide passes through the electrodes 3, 4 totally 4 times to return to the optical waveguide. A transparent electrode, such as ITO, absorbs light slightly. However, such a structure for the light-extracting portion of this embodiment allows light not to mostly pass through the first and second electrodes 3, 4, thereby resulting in a very low loss of light. When the distance therebetween was set to 40 µm and a voltage of 300V was applied, extraction of light was confirmly observed from the light-extracting portion 2.

In FIG. 4A, an example is shown, which provides only two electrodes, i.e., the first and second electrodes 3, 4 to one light-extracting portion. When the light-extracting portion 2 is too large, the distance between the first and second electrodes 3, 4 is so long that a necessary drive voltage to be applied possibly increases. In order to prevent the increase in the drive voltage to be applied, two or more electrodes 3 and two or more electrodes 4 may be provided additionally as shown in FIG. 4B. Providing two or more electrodes 3 and 4 shortens the distance between the electrodes 3 and 4, thereby allowing it to reduce the drive voltage. If the electrodes 3 and 4 are arranged in the center of the second substrate 122 having a large amount of light transmission, a light loss possibly occurs therein. However, the electrodes 3 and 4 may be arranged in the center of the light-extracting portion 2, which has a large amount of light transmission, to the extent that the light loss does not increase as a result of the additional electrodes 3 and 4. A metal having a low resistance is employed for the first and second electrodes 3, 4 to avoid a drive-signal delay due to interconnection resistances.

According to the second embodiment, a display device with a less light loss is enabled as well as in the first embodiment.

Alternatively, the electrodes 3 and 4 may be arranged on the first transparent substrate 121 to obtain the same effect as mentioned above, although the electrodes 3 and 4 are arranged on the liquid crystal dispersion layer 17 in the above description.

Third Embodiment

FIGS. 5 and 6 are views showing partial sectional views of a display device according to a third embodiment. FIGS. 5 and 6 are partial enlarged views showing sections parallel and perpendicular to a longitudinal direction of the optical waveguide 1, respectively. FIG. 6 shows a section cut along the line VI-VI in FIG. 5, i.e., perpendicularly to the longitudinal direction of the optical waveguide 1 of the display device. The third embodiment is different from the second embodiment in the following points: neither the first substrate nor the second substrate is provided; and
the optical waveguide 1 and the liquid crystal dispersion layer 17 are integrated in the third embodiment.

The display device is provided with the liquid crystal dispersion layer 17 formed on a side face of the optical waveguide 1 and a protective layer 13 formed on the liquid crystal dispersion layer 17. The electrodes 3 and 4 are arranged on the protective layer 13 and parallel to the side face of the optical waveguide 1. A gap is formed between the protective layer 13 and the electrodes 3, 4. The liquid crystal dispersion layer 17, which is omitted in FIG. 5, includes the porous body 8 having pores with a mean diameter of 300 nm, the transparent member 7 and the liquid crystal droplets 6 with a mean diameter of 100 nm or less. Both the transparent member 7 and the liquid crystal droplets 6 are formed in the pores as well as in the embodiments described above. The liquid crystal droplets 6 form aggregates 18 with a mean diameter of not less than 300 nm which is equivalent to the diameter of the pores.

An example of the methods to manufacture the display device will be described as follows. That is, the membrane filter employed in the first embodiment was stuck to the side face of the optical waveguide 1 made from acrylics. Then, a mixture of a liquid crystal and ultraviolet curable resin was applied to the membrane filter by a thickness of 10 μm. The mixture was irradiated with ultraviolet to be cured, thereby providing the liquid crystal dispersion layer 17. A mean diameter of the liquid crystal droplets in the liquid crystal dispersion layer is 50 nm, and a mean diameter of the pores is 300 nm in the porous body. Furthermore, a protective layer was applied to the surface of the liquid crystal dispersion layer by a thickness of 5 μm to be cured. In addition, a material having a refractive index lower than the refractive index of the optical waveguide 1 or the equivalent refractive index of the liquid crystal dispersion layer can be employed for the protective layer. Specifically, the materials include fluorine series materials, such as poly fluoro acrylate (PFA, refractive index 1.40), etc. The protective layer serves also as a cladding layer in an optical fiber.

The first and second electrodes 3, 4 were arranged above the protective layer 13 with a gap of 5 μm therebetween and were separated from each other by 50 μm in an in-plane arrangement. 200V was applied between both the electrodes 3, 4. As a result, the liquid crystal dispersion layer 17 was switched into light scattering owing to an electric field generated near the electrodes 3, 4 so that light was extracted from the optical waveguide 1.

When the protective layer and the electrodes are in contact with each other, there is a possibility that light transmitting through the optical waveguide 1 leaks from portions of the electrodes depending on a difference between the refractive indexes of the protective layer 13 and electrodes. However, providing the gap allows it to avoid such a leakage of light therefrom.

There may be a difference between the refractive index of the optical waveguide 1 and the equivalent refractive index of the liquid crystal dispersion layer 17. However, the equivalent refractive index of the liquid crystal dispersion layer 17 is preferably larger than the refractive index of the optical waveguide 1 or equal thereto in order to make it difficult to cause a Fresnel reflection or the total reflection. When polymethylmethacrylate (refractive index 1.49) is employed for the optical waveguide 1, the equivalent refractive index of the liquid crystal dispersion layer 17 can be reduced close to the refractive index of the optical waveguide 1. As a result, the light loss can be reduced. Specifically, a fluorine series material is added or employed for the transparent member 7.

This embodiment enables it to reduce a light loss of a display device as well as the first embodiment.

In addition, this embodiment enables it to continuously form the liquid crystal dispersion layer 17 and the protective layer on a long optical waveguide in an optical fiber form, and eases the manufacturing thereof.

Fourth Embodiment

Figure 7:
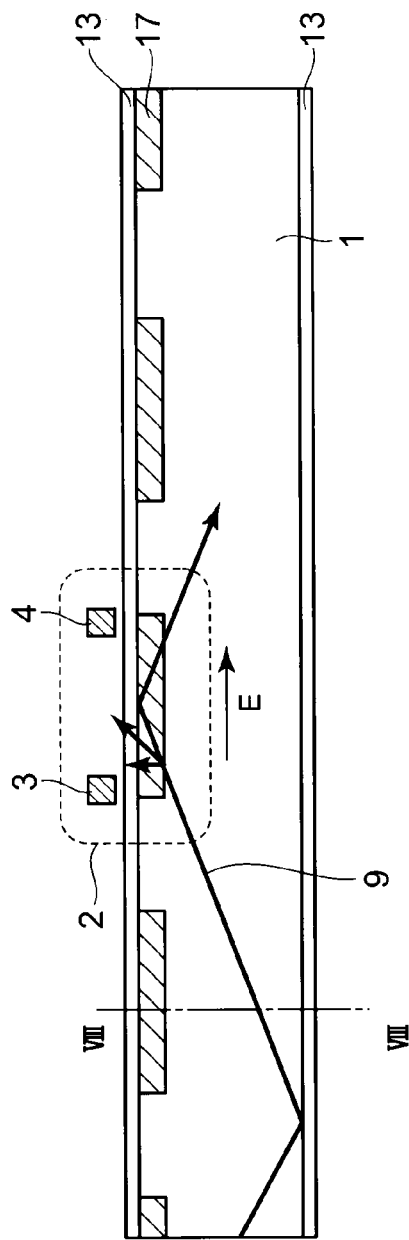
FIG. 7 is an enlarged view showing a sectional structure of a display device according to a fourth embodiment.
Figure 8:
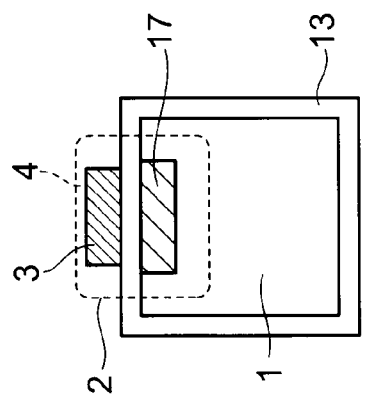
FIG. 8 is an enlarged sectional view showing the display device according to the fourth embodiment cut along the dashed line VIII-VIII shown in FIG. 7.

FIGS. 7 and 8 are views showing sectional structures of a display device according to a fourth embodiment. FIG. 8 shows a section cut along the line VIII-VIII in FIG. 7, i.e., perpendicularly to the longitudinal direction of the optical waveguide 1 of the display device.

The fourth embodiment differs from the third embodiment in that the liquid crystal dispersion layer 17 is discretely formed to be buried in the side face of the optical waveguide 1. That is, two or more liquid crystal dispersion layers 17 are formed parallel to the longitudinal direction of the optical waveguide 1. The protective layer 13 is formed on the side face of the optical waveguide 1, which includes portions to which the liquid crystal dispersion layers 17 is provided. The electrodes 3 and 4 are arranged on the protective layer 13 via a gap. The electrodes 3, 4 are arranged on the liquid crystal dispersion layers 17. The liquid crystal dispersion layer 17, which is omitted in FIG. 6, includes the porous body 8 having pores with a mean diameter of 300 nm, the transparent member 7 and the liquid crystal droplets with a mean diameter of 100 nm or less which are formed in the pores, as well as in the examples mentioned above. The liquid crystal droplets 6 are included in the aggregate 18 with a mean diameter of not less than 300 nm which is equivalent to the diameter of the pores.

An example of the methods to manufacture the display device will be described as follows.

Specifically, the porous body 8 including pores with a mean diameter of 300 nm or more is preliminarily formed in a groove which the optical waveguide 1 has on its side face. After a mixture of a liquid crystal and ultraviolet curable resin for the transparent member 7 is dropped to the groove, the mixture is irradiated with ultraviolet to form the liquid crystal dispersion layer 17. At this time, the liquid crystal droplets 6 with a mean diameter of 50 nm or less form the aggregates 18 with a mean diameter of not less than 300 nm. Then, the protective layer 13 is formed on the side face of the optical wave guide 1 including the liquid crystal dispersion layers 17. The protective layer 13 may serve as a cladding layer, as mentioned in the third embodiment.

More specifically, a mixed solvent of water and ethanol (80 vol %) was heated to 60° C. and was dropped to the groove on the side face of the optical waveguide 1 made from acrylics to be quenched. As a result, an acrylics porous body was formed locally.

Next, the mixture of the liquid crystal material and ultraviolet curable resin is made to percolate through the porous body. E7 (by Merck Co., td., no=1.522, ne=1.746) and NOA81 (by Norland Co., Ltd., refractive index 1.56) were used for a nematic liquid crystal and ultraviolet curable resin, respectively. The mixture ratio of liquid crystal versus resin was set to 30:70. Both the materials were well mixed, and were made to percolate through the porous body on the side face of the optical wave guide. After the percolation, the mixture was irradiated with ultraviolet (300 mW/cm$^2$) for curing to obtain the liquid crystal dispersion layer in which the fine liquid crystal droplets were formed in the resin on the side face of the optical waveguide. The positions of the electrodes were set to coincide with the liquid crystal dispersion layers prepared discretely. Then, the liquid crystal droplets had a mean diameter of 50 nm, and the aggregates had a mean diameter of 500 nm.

The first and the second electrodes 3, 4 were formed to apply a voltage thereto as well as in the third embodiment. The light scattering was enhanced in the liquid crystal dispersion layer just below the first and second electrodes 3, 4, and thereby light was extracted from the light-extracting portion.

In this embodiment, the liquid crystal dispersion layer 17 is partially formed to reduce a used amount of the materials. This leads to cost reduction in comparison with continuously forming the liquid crystal dispersion layer 17 on the side face of the optical waveguide 1. In addition, this embodiment allows it to reduce a light loss due to a difference between the refractive indexes of the optical waveguide 1 and the liquid crystal dispersion layer 17.

Thus, a light loss of the display device can be reduced in this embodiment as well as in the first embodiment.

Fifth Embodiment

A display device according to a fifth embodiment will be explained with reference to FIGS. 9A and 9B. FIG. 9A is an enlarged view showing a section cut along the longitudinal direction of the optical waveguide 1. FIG. 9B is an enlarged partial view showing the liquid crystal dispersion layer 17.

The fifth embodiment differs from the first one in that the electrodes 3, 4 are provided to form a rough boundary between the liquid crystal dispersion layer 17 and the transparent substrate 121, and another rough boundary between the liquid crystal dispersion layer 17 and the transparent substrate 122. Moreover, the liquid crystal dispersion layer 17 includes the aggregates 18, i.e., the liquid crystal droplets 6 and the transparent member 7, but excludes the porous body 8. The equivalent refractive index of the liquid crystal droplets 6 is equal to the refractive index of the transparent member 7 when no voltage is applied. The first and second electrodes 3, 4 are formed on the (uneven) rough surface 20 of the transparent substrates 121, 122. Main surfaces of the electrodes 3 and 4, which face the liquid crystal dispersion layer 17, are provided with uneven rough surfaces 21. A mean diameter of the liquid crystal droplets 6 is 100 nm or less. Moreover, a convex portion in the rough surfaces 21 of the liquid crystal dispersion layer 17 is formed to have a mean diameter L of 1 μm.

As shown in FIG. 9B, the fine liquid crystal droplets 6 aggregate and are eccentrically-located at concavoconvex portions of the rough surfaces 21. That is, the liquid crystal droplets 6 form aggregates with a mean diameter of 1 μm corresponding to the mean diameter L of the convex portion in the rough surfaces 21.

In a section cut across the concavoconvex portions of the rough surface 21 of the liquid crystal dispersion layer 17 (cut along the A-A line), the liquid crystal dispersion layer 17 has the convex portions (first portions) with a mean diameter of 1 μm and the concave portions (second portions) adjacent to the first portions. The first portions include the liquid crystal droplets 6 and the transparent members 7. The transparent substrates 121, 122 are arranged in the concave portions of the liquid crystal dispersion layer 17. A mean refractive index of the liquid crystal droplets 6 and the transparent members 7 is equal to that of the uneven rough surface 20 of the transparent substrates 121, 122 when no electric field is generated.

When a voltage is applied, the equivalent refractive index of the liquid crystal droplets 6 becomes different from that of the transparent member 7. When a voltage is applied, light scattering is easily caused near the rough surface 21 where the liquid crystal droplets 6 aggregate to have a mean diameter of 1 μm. As a result, a portion of light incident on the liquid crystal dispersion layer 17 from the optical waveguide 1 is extracted outside the light-extracting portion 2. Thus, the light-extracting portion 2 controls the scattering condition on the rough surface 21.

The manufacturing of such a display device will be explained below. A mixture of a liquid crystal and ultraviolet curable resin was sandwiched between the first and second electrodes 3, 4 to be irradiated with ultraviolet, thereby forming the dispersion layer 17. E7 (by Merck Co., Ltd., no=1.522, ne=1.746) and NOA81 (by Norland Co., Ltd., refractive index 1.56) are used for a nematic liquid crystal and ultraviolet curable resin, respectively. The mixture ratio of liquid crystal versus resin is set to 30:70. In addition, the thickness of the dispersion layer 17 is set to 20 μm on average.

The main surfaces of the transparent substrates, which were designed to face the electrodes, were made to be rough using NOA81 (by Norland Co., Ltd., refractive index 1.56). Specifically, NOA81 was applied onto a flat plate-like polyethylene substrate and was cured. Then, the surface of the plate-like polyethylene substrate was made to be rough by polishing processing with an abrasive compound of No. 400. When no voltage was applied, the refractive indexes of the rough surface and the liquid crystal dispersion layer did not differ from each other. As a result, light scattering was not observed at the rough surface.

An AC voltage of 200V was applied to the first and second electrodes. A liquid crystal material of the liquid crystal dispersion layer is reoriented in the direction of an electric field to change the equivalent refractive index of the liquid crystal dispersion layer. As a result, the refractive-index difference between the rough surface and the liquid crystal dispersion layer became large. As a result, the light transmitting through the optical waveguide was scattered at the boundary between the rough surface of the second transparent substrate and the liquid crystal dispersion layer, and was extracted. Moreover, the response speed was about 20 μsec.

Thus, this embodiment enables it to reduce a light loss of a display device as well as the first embodiment.

Sixth Embodiment

Figure 10:
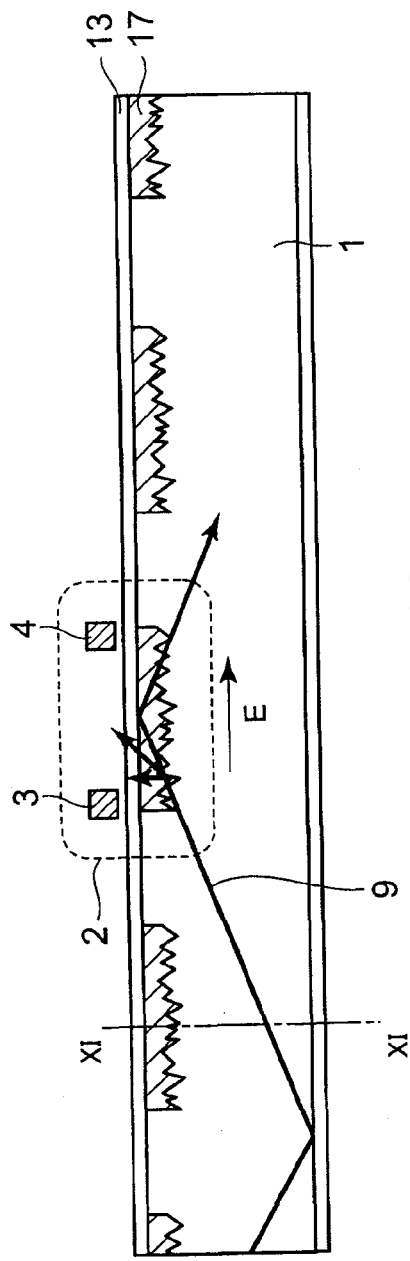
FIG. 10 is an enlarged sectional view showing a display device according to a sixth embodiment.
Figure 11:
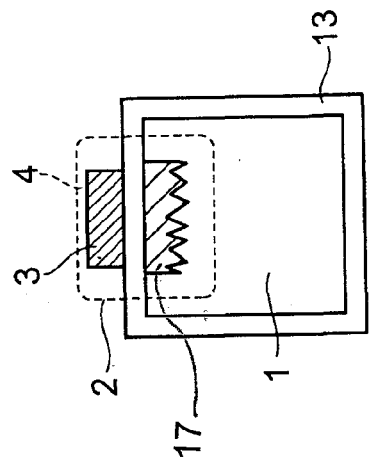
FIG. 11 is an enlarged sectional view of the display device cut along the dashed line XI-XI shown in FIG. 10.

FIGS. 10 and 11 are views showing sectional structures of a display device according to a sixth embodiment. FIG. 10 is an enlarged sectional view showing a display device according to a sixth embodiment. FIG. 11 is an enlarged sectional view of the display device cut along the dashed line XI-XI shown in FIG. 10.

Also in this embodiment, the liquid crystal dispersion layer 17 includes the liquid crystal droplets 6 and the transparent member 7. Two or more liquid crystal dispersion layers 17 are formed so that the liquid crystal dispersion layers 17 are buried in the side face of the optical waveguide 1. The interface between the optical waveguide 1 and the liquid crystal dispersion layer 17, both are mold integrally, is rough as well as in the fifth embodiment. That is, the boundary therebetween is formed to be rough. The protective layer 13 is formed on the side face of the optical waveguide 1 including the liquid crystal dispersion layer 17, and the electrodes 3 and 4 are formed through the protective layer 13 and a gap. The electrodes 3 and 4 are provided to face the liquid crystal dispersion layer 17. The protective layer 13 may serve as a cladding layer as mentioned in the third embodiment. The mean diameter of the liquid crystal droplets 6 is 100 nm or less whereas the concave portions of the rough surface of the liquid crystal dispersion layer 17 have a mean diameter of 1 μm. As a result, the liquid crystal droplets form aggregates with a mean diameter of 1 μm in the concave portions.

Specifically, such a display device was manufactured as follows. That is, concave portions were provided preliminarily on the side face of the optical waveguide 1. The bottoms thereof were made to be rough. A mixture of a liquid crystal material and ultraviolet curable resin was dropped thereto to be cured by ultraviolet irradiation. As a result, the liquid crystal dispersion layers 17 were formed in the concave portions, and then the protective layer 13 was formed.

Next, the first and second electrodes were formed and a voltage was applied thereto as well as in the third embodiment. The positions of the electrodes were set to coincide with the liquid crystal dispersion layers 17 prepared discretely.

The refractive index of the liquid crystal dispersion layer is isotropic to be expressed by the mathematical formula 1 when no voltage is applied. When the same liquid crystal and ultraviolet curable resin as those in the first embodiment was used, the equivalent refractive index of the liquid crystal dispersion layer was 1.571. When polyethylene resin having a refractive index of 1.57 was used for the optical waveguide, light hardly leaked to come out of the liquid crystal dispersion layer.

When a voltage was applied between the first and second electrodes, the difference between the refractive indexes of the liquid crystal dispersion layer and the optical waveguide became large. As a result, light transmitting through the optical waveguide 1 was scattered remarkably at the rough surface, and was extracted from the light-extracting portion.

Since the rough surface scatters visible light more strongly, the rough surface desirably has convexoconcave whose period is equal to a wavelength of visible light or more.

Also according to this embodiment, a display device with a less light loss is enabled as well as in the first embodiment.

Seventh Embodiment

Figure 12A:
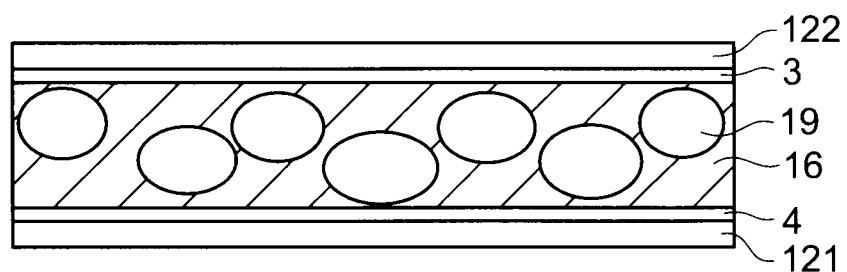
FIGS. 12A and 12B are enlarged sectional views showing a display device according to a seventh embodiment.
Figure 12B:
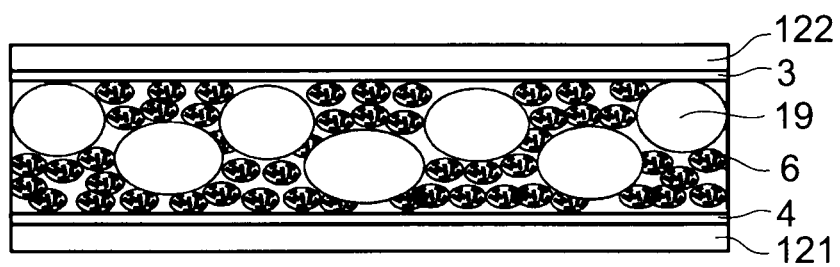

A display device according to a seventh embodiment will be explained with reference to FIGS. 12A and 12B. FIG. 12A is a partially enlarged sectional view showing an optical waveguide 1 parallel to a longitudinal direction of the optical waveguide 1. FIG. 12B is a partially enlarged sectional view showing the optical waveguide 1 perpendicularly to the longitudinal direction of the optical waveguide 1.

The seventh embodiment differs from the first embodiment in a light-scattering method to allow light extraction. That is, the liquid crystal dispersion layer 17 includes particulates 19 with a mean diameter of 300 nm or more in addition to the liquid crystal droplets 6 and the transparent member 7. The particulates 19 employ a transparent material having a refractive index similar to that of the transparent member 7, e.g., Micropearl (by Sekisui Chemical Co. Ltd.), LIOSPHERE (by Toyo Ink Co. Ltd.) etc. The diameter of the liquid crystal droplets is assumed to be 100 nm or less. Specifically, the liquid crystal droplets are formed to have a diameter of 50 nm or less.

As shown in FIG. 12A, a mixture 16 of a liquid crystal material and ultraviolet curable resin, and the fine particles 19 are sandwiched between the first and second electrodes 3, 4 to be irradiated with ultraviolet, thereby providing the liquid crystal dispersion layer 17 including fine liquid crystal droplets 6. The particulates 19 are dispersed in the liquid crystal dispersion layer 17. The transparent member 7 and the liquid crystal droplets 6 having a mean diameter of 50 nm are formed in any area other than the particulates 19 of the liquid crystal dispersion layer 17.

The fine liquid crystal droplets 6 are separated from each other by the particulates 19 so that the fine liquid crystal droplets 6 aggregate to be eccentrically-located. The liquid crystal droplets 6 aggregate around the particulates 19 in the liquid crystal dispersion layers 17.

In a section parallel to the side face of the optical waveguide 1, the liquid crystal dispersion layer 17 has a portion (second portion) including the particulates 19 (first portion) with a mean diameter of 300 nm, the liquid crystal droplets 6 provided around the first portion and the transparent member 7 (second material). The refractive index of the particulates 19 is the same as the mean refractive index of the liquid crystal droplets 6 and the transparent member 7 when no voltage is applied.

When no voltage is applied, the equivalent refractive index of the liquid crystal droplets 6 is expressed with the mathematical formula 1. In that case, the mean refractive index of the liquid crystal droplets 6 and the transparent member 7 is equal to that of the particulates 19, thereby causing no scattering of light transmitting between the first and second electrodes 3, 4. When a voltage is applied between the first and second electrodes 3, 4, the liquid crystals of the liquid crystal dispersion layer 17 are reoriented to change the mean refractive index of the liquid crystal droplets 6 and the transparent member 7, thereby resulting in a difference between the refractive indexes of the particulates 19 and the liquid crystal droplets 6, and a difference between the refractive indexes of the particulates 19 and the transparent member 7. The particulates 19 have a mean diameter of not less than 300 nm to scatter the light transmitting between the first and second electrodes 3, 4. In addition, the liquid crystal droplets 6 have a mean diameter of 50 nm or less in the liquid crystal dispersion layer 17 to allow a rapid response of 20 μsec or less.

A specific method to manufacture the display device according to the seventh embodiment will be described below.

E7 (by Merck Co., Ltd., no=1.522, ne=1.746) and NOA81 (by Norland Co., Ltd., refractive index 1.56) were used for a nematic liquid crystal and ultraviolet curable resin, respectively, to be sandwiched as a mixture thereof between the first and second electrodes. The mixture ratio of liquid crystal versus resin was set to 30:70. Furthermore, Micropearl (by Sekisui Chemical Co. Ltd., refractive index 1.57) with a diameter of 2 μm was added to the mixture as particulates by 5 wt %. The mixture was sandwiched between the first and second electrodes, and cured by ultraviolet irradiation. The thickness of the liquid crystal dispersion layer was set to 20 μm. The liquid crystal droplets have a size shorter than a wavelength of light in the liquid crystal dispersion layer, thereby allowing the liquid crystal dispersion layer 17 to cause no scattering.

When no voltage is applied, the refractive index of the liquid crystal dispersion layer 21 is isotropic. The equivalent refractive index of the liquid crystal droplets is expressed with the mathematical formula 1, and is specifically 1.571. Very little difference between the refractive indexes of the particulates and the liquid crystal dispersion layer caused no scattering of light.

Next, an AC voltage of 200V was applied between the first and second electrodes. The liquid crystal in the liquid crystal dispersion layer is reoriented in a direction of an electric field to change the equivalent refractive index of the liquid crystal dispersion layer 17. As a result, the difference between the refractive index of the particulates and the mean refractive index of the liquid crystal droplets and the transparent material became large. As a result, light transmitting through the optical waveguide was scattered so that the light was extracted. Moreover, the response speed was about 20 μsec.

Thus, this embodiment enables it to reduce a light loss of a display device as well as the first embodiment.

Alternatively, the liquid crystal dispersion layer having particulates in this embodiment may be employed for the liquid crystal dispersion layer in the first to fourth embodiments, and the other constituents other than the liquid crystal dispersion layer may be used without changes, thereby enabling it to reduce a light loss of a display device.

While certain embodiments of the invention have been described, these embodiments have been presented by way of example only, and are not intended to limit the scope of the inventions. Indeed, the novel elements and apparatuses described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A display device comprising:
    a light source;
    an optical waveguide having two ends to guide light from one of the two ends to the other end, the light being emitted by the light source;
    a light-extracting portion which is provided to a side face of the optical waveguide;
    a liquid crystal dispersion layer which is included in the light-extracting portion and includes liquid crystal droplets whose mean diameter is 100 nm or less; and
    a drive circuit which applies a voltage to the light-extracting portion to generate an electric field in the liquid crystal dispersion layer so that the light transmitting through the optical waveguide is scattered to be extracted;
    wherein
    the liquid crystal dispersion layer includes a first portion and a second portion in a section parallel to the side face of the optical waveguide;
    the first portion includes a first material whose mean diameter is 300 nm or more;
    the second portion includes a second material which is different from the first material and is positioned around the first portion;
    either one of the first material and the second material includes the liquid crystal droplets; and
    a refractive index of the first material is equal to the refractive index of the second material when no electric field is generated therein.

2. The device according to claim 1, wherein the liquid crystal dispersion layer includes particles having a mean diameter of 300 nm or more.

3. The device according to claim 1, wherein
    the liquid crystal dispersion layer having a surface parallel to the side face of the optical waveguide is formed so that the surface is formed to have concave portions and convex portions; and
    the convex portions have a mean diameter of 1 µm.

4. The device according to claim 3, wherein two or more liquid crystal dispersion layers are provided discretely in a longitudinal direction of the optical waveguide.

5. The device according to claim 1, wherein
    the liquid crystal dispersion layer is provided with pores whose mean diameter is 300 nm or more; and
    the liquid crystal droplets are provided to the pores.

6. The device according to claim 1, wherein the liquid crystal dispersion layer is buried in the side face of the optical waveguide.

7. The device according to claim 1, wherein
    the light-extracting portion has a first electrode and a second electrode both are arranged parallel to the side face of the optical waveguide; and
    the drive circuit applies a voltage to the first electrode and the second electrode.

8. The device according to claim 1, wherein
    the light-extracting portion has a first electrode and a second electrode both are arranged perpendicularly to the side face of the optical waveguide; and
    the drive circuit applies a voltage to the first electrode and the second electrode.

9. The device according to claim 1, wherein
    two or more optical waveguides are arranged parallel to each other; and
    at least one of the optical waveguides is provided with two or more light-extracting portions.

* * * * *